United States Patent
Kamand

(10) Patent No.: US 11,467,966 B2
(45) Date of Patent: Oct. 11, 2022

(54) CACHE MEMORY HAVING A PROGRAMMABLE NUMBER OF WAYS

(71) Applicant: SHENZHEN GOODIX TECHNOLOGY CO., LTD., Shenzhen (CN)

(72) Inventor: Bassam S Kamand, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/010,775

(22) Filed: Sep. 2, 2020

(65) Prior Publication Data
US 2022/0066933 A1    Mar. 3, 2022

(51) Int. Cl.
*G06F 12/08* (2016.01)
*G06F 12/0864* (2016.01)
(Continued)

(52) U.S. Cl.
CPC ...... *G06F 12/0864* (2013.01); *G06F 12/0646* (2013.01); *G06F 12/084* (2013.01);
(Continued)

(58) Field of Classification Search
CPC ............... G06F 12/084; G06F 12/0646; G06F 12/0846; G06F 13/1689; G06F 12/0864; G06F 12/0875; G06F 12/0877
See application file for complete search history.

(56) References Cited

U.S. PATENT DOCUMENTS

| 5,073,891 A | * | 12/1991 | Patel | G11C 29/14 714/720 |
| 5,493,667 A | * | 2/1996 | Huck | G06F 12/126 711/125 |

(Continued)

FOREIGN PATENT DOCUMENTS

WO    2016097810 A1    6/2016

OTHER PUBLICATIONS

Design of an Adjustable-way Set-associative Cache by Chen (Year: 2001).*
(Continued)

*Primary Examiner* — Paul M Knight
(74) *Attorney, Agent, or Firm* — Kilpatrick Townsend & Stockton LLP

(57) ABSTRACT

A cache memory is disclosed. The cache memory includes an instruction memory portion, a tag memory portion, and one or more peripheral circuits configured to receive a CPU address corresponding with an address of the RAM memory storing a particular CPU instruction. The one or more peripheral circuits are configured to receive a way quantity indication indicating of a number of ways into which the instruction memory portion and the tag memory portion are to be subdivided, the one or more peripheral circuits are configured to identify which bits of the CPU address form the tag portion based on the way quantity indication, and the one or more peripheral circuits are configured to determine whether the particular CPU instruction is stored in the cache memory based on the identified tag portion of the CPU address and tag data stored in the cache memory.

14 Claims, 7 Drawing Sheets

(51) Int. Cl.
    *G06F 12/06*           (2006.01)
    *G06F 12/084*         (2016.01)
    *G06F 12/0846*       (2016.01)
    *G06F 12/0875*       (2016.01)
    *G06F 12/0877*       (2016.01)
    *G06F 13/16*           (2006.01)

(52) U.S. Cl.
    CPC ...... *G06F 12/0846* (2013.01); *G06F 12/0875* (2013.01); *G06F 12/0877* (2013.01); *G06F 13/1689* (2013.01)

(56) References Cited

U.S. PATENT DOCUMENTS

| | | | | |
|---|---|---|---|---|
| 6,308,261 B1* | 10/2001 | Morris | ............... | G06F 9/3851 |
| | | | | 712/228 |
| 6,345,336 B1* | 2/2002 | Takahashi | ........... | G06F 12/0895 |
| | | | | 711/3 |
| 2005/0223172 A1* | 10/2005 | Bortfeld | .............. | G06F 12/04 |
| | | | | 711/125 |
| 2006/0277397 A1* | 12/2006 | Sartorius | ............ | G06F 9/3844 |
| | | | | 712/240 |

OTHER PUBLICATIONS

The V-Way Cache : Demand Based Associativity via Global Replacement by Qureshi (Year: 2004).*
Is there a difference CPU Clock and Instruction Clock? by Mike (Year: 2016).*
European Patent Office, Extended European Search Report Issued in Application No. 21194074.7, dated Jan. 17, 2022, Germany, 8 pages.

* cited by examiner

CPU Address

CPU Address

CACHE MEMORY HAVING A PROGRAMMABLE NUMBER OF WAYS

FIELD OF THE INVENTION

The present application generally pertains to cache memories, and more particularly to cache memory having a programmable number of ways.

BACKGROUND OF THE INVENTION

Cache memories are used in computer systems to reduce instruction access time for frequently used instructions. Central Processing Unit (CPU) executable instructions are stored in RAM, and are available for access by the CPU, as needed. Some, but not all, instructions, for example, recently used instructions, are additionally stored in the cache memory. Because the cache memory is faster than RAM, the cache memory is preferred, and is used if the instruction needed by the CPU is stored therein. If the instruction needed by the CPU is not stored in the cache memory, the instruction is retrieved from the RAM. The instruction retrieved from RAM may then be stored in the cache memory according to a replacement policy. Improved replacement policies are needed in the art.

Some cache memories are subdivided in a plurality of subsections called ways. Other cache memories are not subdivided. An unsubdivided cache memory may be considered as having only a single way and termed a direct access or 1-way cache memory. Direct access cache memories may advantageously provide faster access than multiple way associative cache memories. However, multiple way associative cache memories may reduce or eliminate conflicts and misses in comparison with direct access cache memories.

Programmable cache memories, which may be programmed to be either direct access or multiple way associative are needed in the art.

BRIEF SUMMARY OF THE INVENTION

One inventive aspect is a cache memory. The cache memory includes an instruction memory portion, where the instruction memory portion includes a plurality of instruction memory locations each configured to store instruction data encoding a CPU instruction, a tag memory portion, wherein the tag memory portion includes a plurality of tag memory locations each configured to store tag data encoding an address range of a RAM memory where one of the CPU instructions are stored, and one or more peripheral circuits configured to receive a CPU address corresponding with an address of the RAM memory storing a particular CPU instruction, where the CPU address has a plurality of bits divided into a tag portion and an index portion, the tag portion including tag data for the for the particular CPU instruction, and the index portion including memory address data for the cache memory. The one or more peripheral circuits are configured to receive a way quantity indication indicating of a number of ways into which the instruction memory portion and the tag memory portion are to be subdivided, the one or more peripheral circuits are configured to identify which bits of the CPU address form the tag portion based on the way quantity indication, and the one or more peripheral circuits are configured to determine whether the particular CPU instruction is stored in the cache memory based on the identified tag portion of the CPU address and tag data stored in the cache memory.

In some embodiments, the one or more peripheral circuits are configured to identify which bits of the CPU address form the index portion based on the way quantity indication.

In some embodiments, the one or more peripheral circuits are configured to read the cache memory to retrieve the particular CPU instruction using the index portion as cache memory address data.

In some embodiments, in response to the way quantity indication indicating that the instruction memory portion and the tag memory portion are to be subdivided into a plurality of ways, the one or more peripheral circuits are configured to read the cache memory to retrieve the particular CPU instruction using the index portion and a portion of the tag portion as cache memory address data.

In some embodiments, in response to the way quantity indication indicating that the instruction memory portion and the tag memory portion are to be subdivided into a single way, the one or more peripheral circuits are configured to read the cache memory to retrieve the particular CPU instruction using the index portion as cache memory address data without using the tag portion as cache memory address data.

In some embodiments, the one or more peripheral circuits include a peripheral comparison circuit configured to determine whether the particular CPU instruction is stored in the cache memory.

In some embodiments, the one or more peripheral circuits include a peripheral comparison circuit configured to, in response to the way quantity indication indicating that the instruction memory portion and the tag memory portion are to be subdivided into a plurality of ways, identify which of the plurality of ways of the instruction memory portion the particular CPU instruction is stored in.

In some embodiments, tag memory locations of the tag memory portion are configured to be read during a first time period, and where the read tag memory locations are each identified with the index portion of the CPU address.

In some embodiments, an instruction memory location of the instruction memory portion is configured to be read during a second time period, the second time period is subsequent to the first time period, and the read instruction memory location is identified by one of A) a combination of the tag address data read during the first time period and the index portion of the CPU address because of the way quantity indication indicating that the instruction memory portion and the tag memory portion are to be subdivided into a plurality of ways, and B) the index portion of the CPU address without data from the tag portion of the CPU address because of the way quantity indication indicating that the instruction memory portion and the tag memory portion are to be subdivided into a single way.

In some embodiments, the first time period and the second time period occur within a single clock cycle of a CPU clock period.

Another inventive aspect is a method of using a cache memory. The method includes, with an instruction memory portion of the cache memory, the instruction memory portion including a plurality of instruction memory locations, storing instruction data encoding a plurality of CPU instructions. The method includes, with a tag memory portion of the cache memory, the tag memory portion including a plurality of tag memory locations, storing tag data encoding address ranges of a RAM memory where the CPU instructions are stored, and with one or more peripheral circuits of the cache memory, receiving a CPU address corresponding with an address of the RAM memory storing a particular CPU instruction, where the CPU address has a plurality of bits divided into a tag portion and an index portion, the tag portion including tag data for the for the particular CPU instruction, and the index portion including memory address data for the cache memory. The method also includes, with the one or more peripheral circuits, receiving a way quantity indication indicating of a number of ways into which the instruction memory portion and the tag memory portion are to be subdivided, with the one or more peripheral circuits, identifying which bits of the CPU address form the tag portion based on the way quantity indication, and with the one or more peripheral circuits, determining whether the particular CPU instruction is stored in the cache memory based on the identified tag portion of the CPU address and tag data stored in the cache memory.

In some embodiments, the method also includes, with the one or more peripheral circuits, identifying which bits of the CPU address form the index portion based on the way quantity indication.

In some embodiments, the method also includes, with the one or more peripheral circuits, reading the cache memory to retrieve the particular CPU instruction using the index portion as cache memory address data.

In some embodiments, the method also includes, in response to the way quantity indication indicating that the instruction memory portion and the tag memory portion are to be subdivided into a plurality of ways, with the one or more peripheral circuits, reading the cache memory to retrieve the particular CPU instruction using the index portion and a portion of the tag portion as cache memory address data.

In some embodiments, the method also includes, in response to the way quantity indication indicating that the instruction memory portion and the tag memory portion are to be subdivided into a single way, with the one or more peripheral circuits, reading the cache memory to retrieve the particular CPU instruction using the index portion as cache memory address data without using the tag portion as cache memory address data.

In some embodiments, the one or more peripheral circuits include a peripheral comparison circuit, and the method further includes, with the peripheral comparison circuit, determining whether the particular CPU instruction is stored in the cache memory.

In some embodiments, the one or more peripheral circuits include a peripheral comparison circuit, and the method further includes, with the peripheral comparison circuit, in response to the way quantity indication indicating that the instruction memory portion and the tag memory portion are to be subdivided into a plurality of ways, identifying which of the plurality of ways of the instruction memory portion the particular CPU instruction is stored in.

In some embodiments, tag memory locations of the tag memory portion are configured to be read during a first time period, and where the read tag memory locations are each identified with the index portion of the CPU address.

In some embodiments, an instruction memory location of the instruction memory portion is configured to be read during a second time period, where the second time period is subsequent to the first time period, and where the read instruction memory location is identified by one of A) a combination of the tag address data read during the first time period and the index portion of the CPU address because of the way quantity indication indicating that the instruction memory portion and the tag memory portion are to be subdivided into a plurality of ways, and B) the index portion of the CPU address without data from the tag portion of the CPU address because of the way quantity indication indicating that the instruction memory portion and the tag memory portion are to be subdivided into a single way.

In some embodiments, the first time period and the second time period occur within a single clock cycle of a CPU clock period.

DETAILED DESCRIPTION OF THE INVENTION

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Figure 1:
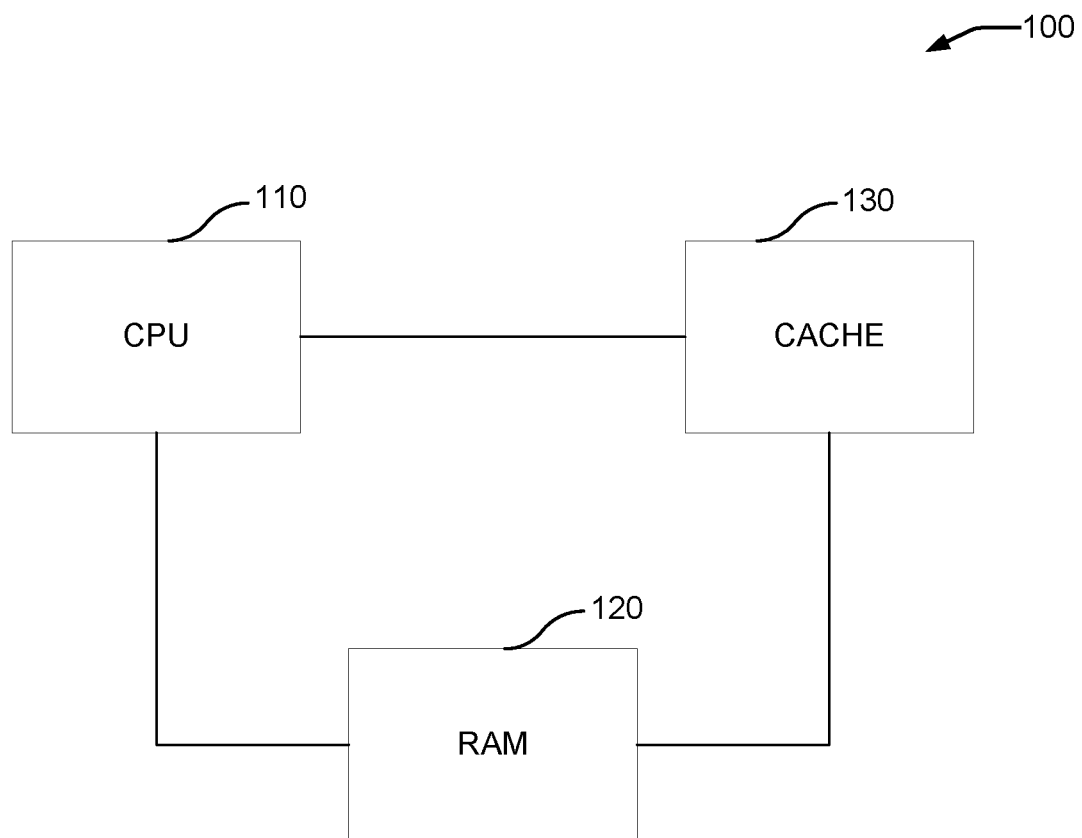
FIG. 1 is a schematic block diagram illustrating a computer system

FIG. 1 is a schematic illustration of a computer system 100. Computer system 100 includes CPU 110, random access memory (RAM) 120, and cache memory 130.

The information stored in a cache memory 130 includes instructions which the CPU 110 may need for executing a software application. The information stored in the cache memory 130 also includes information for each particular instruction identifying a portion or address range of the RAM 120 the particular instruction is stored in. The identifying information is called a tag. Other information, such as an offset or a validity indication, may additionally be stored in the cache memory, as understood by those of skill in the art.

As understood by those of skill in the art, in computer systems, cache memories may be subdivided into multiple ways, where each way is independently written and read. A cache memory having N ways may be called an N way associative cache memory. A cache memory having 1 way may be called a 1 way associative cache memory, or a direct access cache memory. To fetch an instruction from the cache memory, the CPU provides an address to the cache memory. The CPU address includes a tag portion and an index portion. In some embodiments, the CPU address may additionally include other information, such as an offset, as understood by those of skill in the art.

In some cache memories, the index portion of the CPU address is used to read one instruction and its corresponding tag from each of the one or more ways. Accordingly, a number of instructions corresponding to the number of ways, along with each of their corresponding tags, are read from the cache memory based on the index portion of the CPU address.

In some cache memories, the tags associated with the instructions are each compared to the tag portion of the CPU address. If one of the tags matches the tag portion of the CPU address, the instruction corresponding with the matching tag is provided to the CPU as the instruction requested by the CPU. If none of the read tags match the tag portion of the CPU address, the instruction requested by the CPU is not located in the cache memory, and must, instead, be retrieved from RAM.

When an instruction requested by the CPU is not available in the cache memory, the instruction is fetched from RAM. In addition, the instruction fetched from RAM may be written to the cache memory so as to be available for subsequent requests from the CPU. The instruction to be written to the cache memory may be written to a particular identified one of the M ways of the memory, at a location within the identified one way specified by the index portion of the CPU address.

In cache memories having multiple ways, which of the multiple ways the instruction is to be written to, may be determined based on a cache memory replacements policy.

Figure 2:
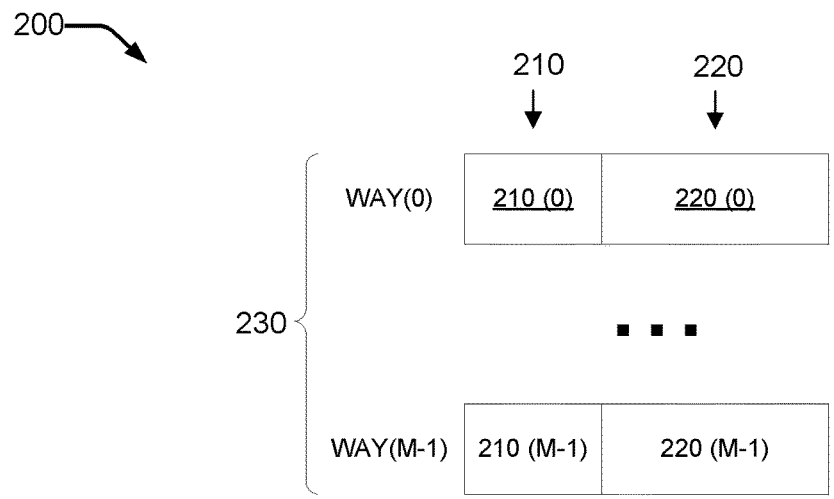
FIG. 2 is a schematic illustration of a cache memory according to some embodiments.

FIG. 2 is a schematic illustration of a cache memory 200 according to some embodiments. Cache memory 200 may be used in computer system 100 as cache memory 130. Cache memory 200 includes M ways 230, where each way includes a tag memory portion 210 and an instruction memory portion 220. Cache memory 200 is programmable so as to have at least two of 1, 2, 4, 8, 12, 16, 24, 32, and another number of ways.

In some embodiments, the ways of cache memory 200 each include one or more other memory portions, as understood by those of skill in the art. For example, in some embodiments, each way includes a valid bit portion, where each bit in the valid bit portion indicates whether a particular instruction is valid, as understood by those of skill in the art.

Instruction memory portion 220 is written with data corresponding with CPU instructions according to the replacement policy. In addition, tag memory portion 210 is written with data corresponding with portions or address ranges of the RAM the instructions are stored in.

Instruction memory portion 220 may include one or more memory circuits, despite being abstractly or conceptually segmented into the M ways. Accordingly, instruction memory portion 220 may include one or more memory cell arrays, which each receive signals from and provide signals to a number of peripheral circuits which are used to access the memory cells for writing and for reading instruction information. As understood by those of skill in the art, the peripheral circuits may include, for example, an address decoder, sense amplifiers, a column multiplexer, and output buffers. In some embodiments, the peripheral circuits may include one or more other circuits. The memory cells are each constituent to a particular one of the ways. The peripheral circuits, however, may each receive signals from or provide signals to memory cells of one or more of the ways. In some embodiments, instruction memory portion 220 is formed as a single memory circuit.

Tag memory portion 210 may include one or more memory circuits. Accordingly, each way includes an array of memory cells which receives signals from and provides signals to a number of peripheral circuits, which are used to access the memory cells for writing and for reading tag information. As understood by those of skill in the art, the peripheral circuits may include, for example, an address decoder, sense amplifiers, a column multiplexer, and output buffers. In some embodiments, the peripheral circuits may include one or more other circuits. The memory cells and the peripheral circuits are each constituent to a particular one of the ways. In some embodiments, instruction memory portion 220 is formed as M memory circuits, where M is the maximum number of ways the cache memory 200 can be programmed to have.

In some embodiments, instruction memory portion 220 and tag memory portion 210 are included in the same one or more memory circuits. In some embodiments, one or more peripheral circuits are configured to access memory cells for writing and for reading tag information to tag memory portion 210 and for writing and reading instruction information to instruction memory portion 220.

Cache memory 200 is structured so that, to fetch an instruction therefrom, the CPU, such as CPU 110 provides an address to peripheral circuitry of the cache memory 200. The CPU address includes a tag portion and an index portion. In some embodiments, the CPU address may additionally include other information, such as an offset, as understood by those of skill in the art.

The size or width or number of bits of each of the tag portion and the index portion of the CPU address changes with the number of ways the cache memory 200 is programmed for. For example, when the cache memory 200 is programmed to have two ways, the tag portion may have one more bit than the tag portion has when the cache memory 200 is programmed to have one way. Similarly, when the cache memory 200 is programmed to have two ways, the index portion may have one less bit than the index portion has when the cache memory 200 is programmed to have one way. In addition, when the cache memory 200 is programmed to have four ways, the tag portion may have two more bits than the tag portion has when the cache memory 200 is programmed to have one way. Similarly, when the cache memory 200 is programmed to have four ways, the index portion may have two fewer bits than the index portion has when the cache memory 200 is programmed to have one way.

The index portion of the CPU address identifies a memory location in each of the tag memory portions 210(0) to 210(M−1) of the M ways. The memory locations of the M tag memory portions 210(0) to 210(M−1) are each associated with a memory location in a corresponding one of the instruction memory portions 220(0) to 220(M−1) of the M ways. The association of the M tag memory portions 210(0) to 210(M−1) and the instruction memory portions 220(0) to 220(M−1) of the M ways is instantiated in hardware at least by the memory locations of the M tag memory portions 210(0) to 210(M−1) and their associated memory locations of instruction memory portion 220(0) to 220(M-1) having an address partially or wholly identified by the index portion of the CPU address.

The memory locations of the M tag memory portions 210(0) to 210(M-1) identified by the index portion of the CPU address are read to retrieve M tags. The M tags are each compared with the tag portion of the CPU address. If one of the M tags matches the tag portion of the CPU address, a cache hit condition is identified, and the way having the matching tag is specified. Subsequently, the index portion of the CPU address is used to read an instruction from the instruction memory portion 220(x) of the identified way. The instruction read from the instruction memory portion 220(x) of the identified way is returned to the CPU as the instruction requested by the CPU.

If none of the tags matches the tag portion of the CPU address, the instruction requested by the CPU is not located in the cache memory, a cache miss condition is identified, and the instruction requested by the CPU must be retrieved from RAM.

In addition, in some embodiments, the instruction requested by the CPU is also written to a memory location in one of the instruction memory portions 220(0) to 220(M-1) of the M ways of the cache memory, and the tag portion of the CPU address, which was not matched to the previously stored M tags, is written to the corresponding memory location of the corresponding tag memory portion 210(0) to 210(M-1).

Which of the M instruction memory portions 220(0) to 220(M-1) and M tag memory portion 210(0) to 210(M-1) store the requested CPU instruction and the corresponding tag is identified by a cache memory replacement policy. The specific memory location of the identified instruction memory portion and tag memory portion is identified by the index portion of the CPU address.

Cache memory 200 is configured to have a programmable number of ways.

Figure 3:
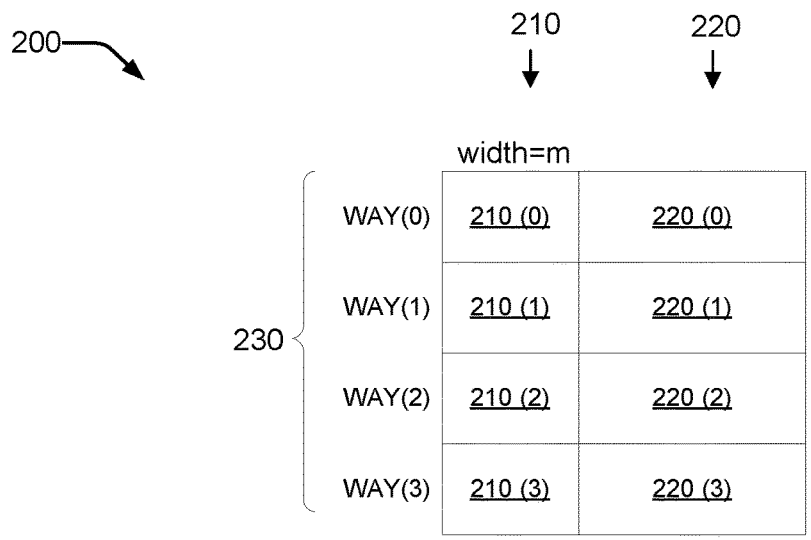
FIG. 3 is a schematic illustration of the cache memory system of FIG. 2 programmed to have four ways.

FIG. 3 is a schematic illustration of cache memory 200 according to some embodiments when programmed to have four ways, where each way includes a tag memory portion 210 and an instruction memory portion 220. In this embodiment, the maximum number M of ways cache memory 200 can have is four.

Instruction memory portion 220 is written with data corresponding with CPU instructions according to the replacement policy. In addition, tag memory portion 210 is written with data corresponding with portions or address ranges of the RAM the instructions are stored in.

In this embodiment, cache memory 200 is structured so that, to fetch an instruction therefrom, the CPU, such as CPU 110, provides an address to peripheral circuitry of the cache memory 200. The CPU address includes a tag portion and an index portion. In some embodiments, the CPU address may additionally include other information, such as an offset, as understood by those of skill in the art.

Because the cache memory 200 is programmed to have four ways, the tag portion may have two more bits than the tag portion has when the cache memory 200 is programmed to have one way. In addition, because the cache memory 200 is programmed to have four ways, the index portion may have two fewer bits than the index portion has when the cache memory 200 is programmed to have one way.

The index portion of the CPU address identifies a memory location in each of the tag memory portions 210(0) to 210(3) of the four ways. The memory locations of the four tag memory portions 210(0) to 210(3) are each associated with a memory location in a corresponding one of the instruction memory portions 220(0) to 220(3) of the four ways. The association of the four tag memory portions 210(0) to 210(3) and the instruction memory portions 220(0) to 220(3) of the four ways is instantiated in hardware at least by the memory locations of each of the four tag memory portions 210(0) to 210(3) and their associated memory locations of instruction memory portion 220(0) to 220(3) having an address partially or wholly identified by the index portion of the CPU address.

The four memory locations of the four tag memory portions 210(0) to 210(3) identified by the index portion of the CPU address are read to retrieve four tags. The four tags are each compared with the tag portion of the CPU address. If one of the four tags matches the tag portion of the CPU address, a cache hit condition is identified, and the one of the four ways having the matching tag is identified. Subsequently, the index portion of the CPU address is used to read an instruction from the instruction memory portion 220(x) of the identified way. The instruction read from the instruction memory portion 220(x) of the identified way is returned to the CPU as the instruction requested by the CPU.

If none of the tags matches the tag portion of the CPU address, the instruction requested by the CPU is not located in the cache memory, a cache miss condition is identified, and the instruction requested by the CPU is retrieved from RAM.

In addition, in some embodiments, the instruction requested by the CPU is also written to a memory location in one of the instruction memory portions 220(0) to 220(3) of the four ways of the cache memory, and the tag portion of the CPU address, which was not matched to the previously stored four tags, is written to the corresponding memory location of the corresponding tag memory portion 210(0) to 210(3).

Which of the four instruction memory portions 220(0) to 220(3) and four tag memory portion 210(0) to 210(3) store the requested CPU instruction and the corresponding tag is identified by a cache memory replacement policy. The specific memory location of the identified instruction memory portion and tag memory portion is identified by the index portion of the CPU address.

Figure 4:
FIG. 4 is a schematic illustration of a tag portion and an index portion of a CPU address used when the cache memory is programmed as illustrated in FIG. 3.

FIG. 4 is a schematic illustration of a tag portion and an index portion of a CPU address used when the cache memory is programmed as illustrated in FIG. 3.

As illustrated, the tag portion of the CPU address has a width of m+2 bits. In addition, the index portion of the CPU address has a width of j bits, where j corresponds with the index portion width when the cache memory 200 is programmed to have the maximum number of ways.

Figure 5:
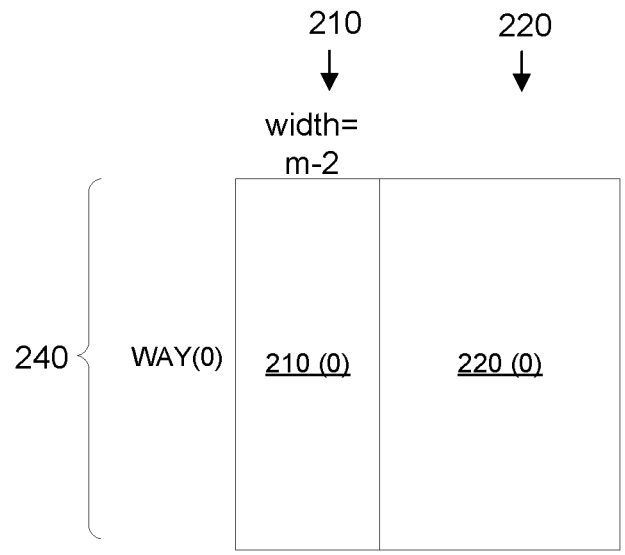
FIG. 5 is a schematic illustration of the cache memory system of FIG. 2 programmed to have one way.

FIG. 5 is a schematic illustration of cache memory 200 according to some embodiments when programmed to have one way, where the one way includes a tag memory portion 210 and an instruction memory portion 220. When cache memory 200 is programmed to have only one way, in a direct access configuration, the tag memory portion 210 has a memory capacity or size to store a number of tags equivalent to the sum of the quantity of tags storable by the tag memory portions of the four ways of cache memory 200 when programmed to have four ways, as illustrated in FIG. 3, or any other number of ways. Similarly, when cache memory 200 is programmed to have only one way, the instruction memory portion 220 has a memory capacity or size to store a number of instructions equivalent to the sum of the quantity of instructions storable by the instructions memory portions of the four ways of cache memory 200 when programmed to have four ways, as illustrated in FIG. 3, or any other number of ways.

Instruction memory portion 220 is written with data corresponding with CPU instructions according to the replacement policy. In addition, tag memory portion 210 is written with data corresponding with portions or address ranges of the RAM the instructions are stored in.

In this embodiment, cache memory 200 is structured so that, to fetch an instruction therefrom, the CPU, such as CPU 110, provides an address to peripheral circuitry of the cache memory 200. The CPU address includes a tag portion and an index portion. In some embodiments, the CPU address may additionally include other information, such as an offset, as understood by those of skill in the art.

Because the cache memory 200 is programmed to have one way, the tag portion may have two fewer bits than the tag portion has when the cache memory 200 is programmed to have four ways, as illustrated in FIG. 3. In addition, because the cache memory 200 is programmed to have one way, the index portion may have two more bits than the index portion has when the cache memory 200 is programmed to have four ways.

The index portion of the CPU address identifies a memory location in the tag memory portion 210(0). The memory location of the tag memory portion 210(0) is associated with a memory location in the instruction memory portion 220(0). The association of memory locations of the tag memory portions 210(0) and the memory locations of the instruction memory portions 220(0) is instantiated in hardware at least by the memory locations of the tag memory portion 210(0) and their associated memory locations of the instruction memory portion 220(0) having an address partially or wholly identified by the index portion of the CPU address.

The memory location of tag memory portion 210(0) identified by the index portion of the CPU address is read to retrieve a tag. The tag is compared with the tag portion of the CPU address. If tag read matches the tag portion of the CPU address, a cache hit condition is identified, and the index portion of the CPU address is used to read an instruction from the instruction memory portion 220(0). The instruction read from the instruction memory portion 220(0) is returned to the CPU as the instruction requested by the CPU.

If the tag does not matches the tag portion of the CPU address, the instruction requested by the CPU is not located in the cache memory, a cache miss condition is identified, and the instruction requested by the CPU is retrieved from RAM.

In addition, in some embodiments, the instruction requested by the CPU is also written to a memory location in the instruction memory portion 220(0) of the cache memory, and the tag portion of the CPU address, which was not matched to the previously stored tag, is written to the corresponding memory location of tag memory portion 210(0).

Figure 6:
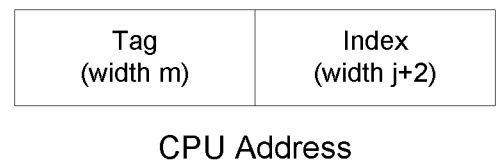
FIG. 6 is a schematic illustration of a tag portion and an index portion of a CPU address used when the cache memory is programmed as illustrated in FIG. 5.

FIG. 6 is a schematic illustration of a tag portion and an index portion of a CPU address used when the cache memory is programmed as illustrated in FIG. 5.

As illustrated, the tag portion of the CPU address has a width of m bits, where m corresponds with the tag portion width when the cache memory 200 is programmed to have one way. In addition, the index portion of the CPU address has a width of j+2 bits. When compared with the tag portion of the CPU address illustrated in FIG. 4, we note that the tag portion of the CPU address when the cache memory is programmed to have one way has two fewer bits than the tag portion of the CPU address when the cache memory is programmed to have four ways. Similarly, when compared with the index portion of the CPU address illustrated in FIG. 4, we note that the index portion of the CPU address when the cache memory is programmed to have one way has two more bits than the index portion of the CPU address when the cache memory is programmed to have him four ways.

Cache memory 200 may, for example, be implemented in a cache memory topology having feature similar or identical to those discussed in U.S. application Ser. No. 16/817,609, filed Mar. 13, 2020, which is incorporated herein by reference.

For example, the tag memory portion 210 may be configured to accommodate a maximum number (M) of ways, and may be programmed to function as having a lesser number of ways, such as M/2, M/4, . . . , or 1 ways.

Figure 7:
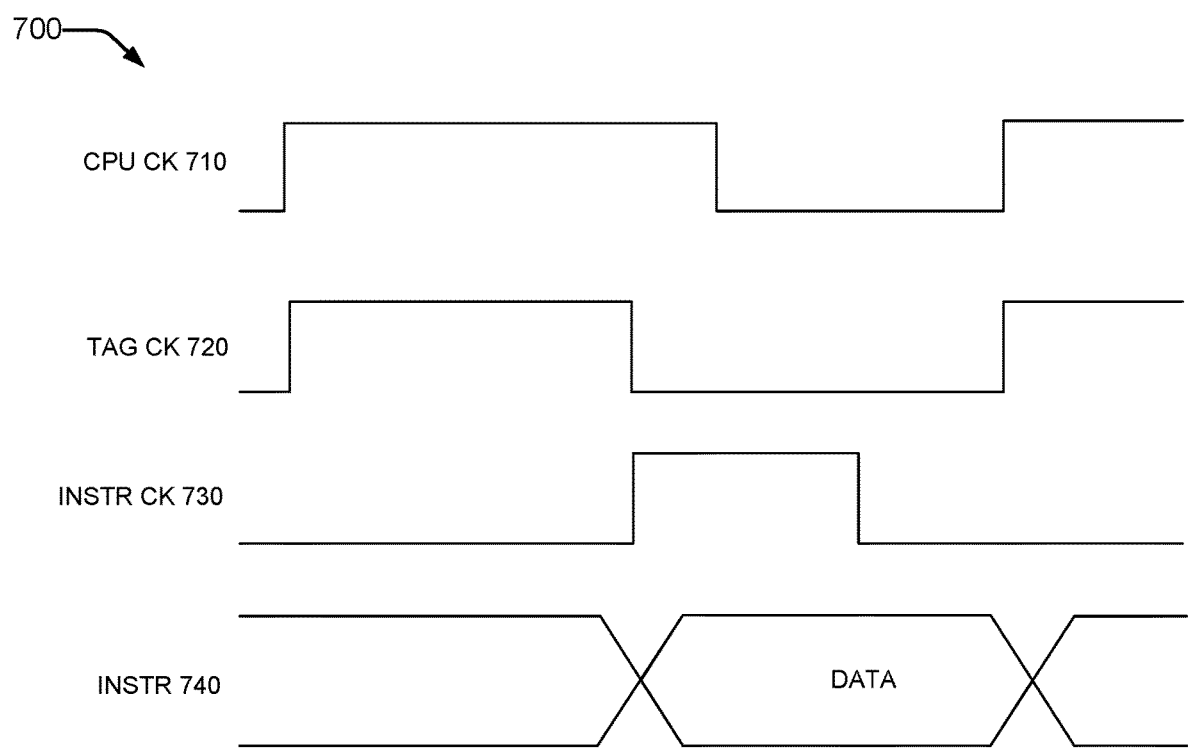
FIG. 7 illustrates a timing diagram schematically illustrating certain timing relationships for various operations of a cache memory.

FIG. 7 illustrates a timing diagram 700 schematically illustrating certain timing relationships for various operations of cache memory 200. Timing diagram 700 illustrates CPU clock waveform 710, tag clock waveform 720, instruction clock waveform 730, and instruction waveform 740. The illustrated waveforms correspond with clocks generated by clock generation circuits understood by those of skill in the art.

CPU clock waveform 710 illustrates a representation of a CPU clock used by the CPU 110. As understood by those of skill in the art, the CPU clock represented by CPU clock waveform 710 may be used by CPU 110, for example, to receive input data, to execute instructions, and to generate output data. CPU 110 may use the CPU clock represented by CPU clock waveform 710 to additionally perform other operations. CPU 110 may use additional clocks (not shown).

Tag clock waveform 720 illustrates a representation of a tag clock used by tag memory portion 210. The tag clock represented by tag clock waveform 720 may be used by tag memory portion 210, for example, for writing and reading tag data to and from tag memory portion 210.

Instruction clock waveform 730 illustrates a representation of an instruction clock used by instruction memory portion 220. The instruction clock represented by instruction clock waveform 730 may be used by instruction memory portion 220, for example, for writing and reading instruction data to and from instruction memory portion 220.

Instruction waveform 740 illustrates a representation of instruction data. The instruction data encodes instructions which are executable by CPU 110, and which are provided to CPU 110 by cache memory 200, for example, for execution by CPU 110.

As illustrated in FIG. 7, during a first portion of a CPU clock period, the tag clock is active (high). While the tag clock is active, the M tag memory portions 210(0) to 210(M−1) identified by bits 0 through j of the index portion of the CPU address are read to retrieve M tags.

In addition, while the tag clock is active, if the cache memory 200 is programmed for M ways, the M tags are each compared with the tag portion of the CPU address. If one of the M tags matches the tag portion of the CPU address, the way having the matching tag and the cache memory hit condition are identified.

Furthermore, while the tag clock is active, if the cache memory 200 is programmed for M/n ways, M/n tags are each compared with the tag portion of the CPU address. Which M/n of the M tags are compared with the tag portion of the CPU address is determined based on a number of additional log 2(n) bits (>j) of the index portion of the CPU address. If one of the M/n tags matches the tag portion of the CPU address, the way having the matching tag and the cache memory hit condition are identified.

Furthermore, while the tag clock is active, if the cache memory 200 is programmed for 1 way, 1 tag is compared with the tag portion of the CPU address. Which 1 of the M tags are compared with the tag portion of the CPU address is determined based on a number of additional log 2(M) bits (>j) of the index portion of the CPU address. If the compared tag matches the tag portion of the CPU address, the cache memory hit condition are identified.

During a second, subsequent, portion of the CPU clock period, the instruction clock is active (high).

If the cache memory 200 is programmed for M ways, during the second portion of the CPU clock period, the index portion of the CPU address (j bits) is used to perform a read operation on the instruction memory portion 220(x) of the identified way to read an instruction therefrom. If the cache memory 200 is programmed for M/n ways, during the second portion of the CPU clock period, the index portion of the CPU address (j+log 2(n) bits) is used to perform a read operation on the instruction memory portion 220(x) of the identified way to read an instruction therefrom. If the cache memory 200 is programmed for one way, during the second portion of the CPU clock period, the index portion of the CPU address (j+log 2(M) bits) is used to perform a read operation on the instruction memory portion 220(x) of the identified way to read an instruction therefrom. Once read, the instruction read from the instruction memory portion 220(x) of the identified way is returned to the CPU 110 as the instruction requested by the CPU 110.

Timing diagram 700 schematically illustrates an embodiment of certain timing relationships for CPU clock waveform 710, tag clock waveform 720, instruction clock waveform 730, and instruction waveform 740. Alternative timing relationships may alternatively be used. For example, the phase relationship between CPU clock waveform 710 and either or both of tag clock waveform 720 and instruction clock waveform 730 may be modified. Additionally or alternatively, in some embodiments, the active states of either or both of tag clock waveform 720 and instruction clock waveform 730 are low.

Figure 8:
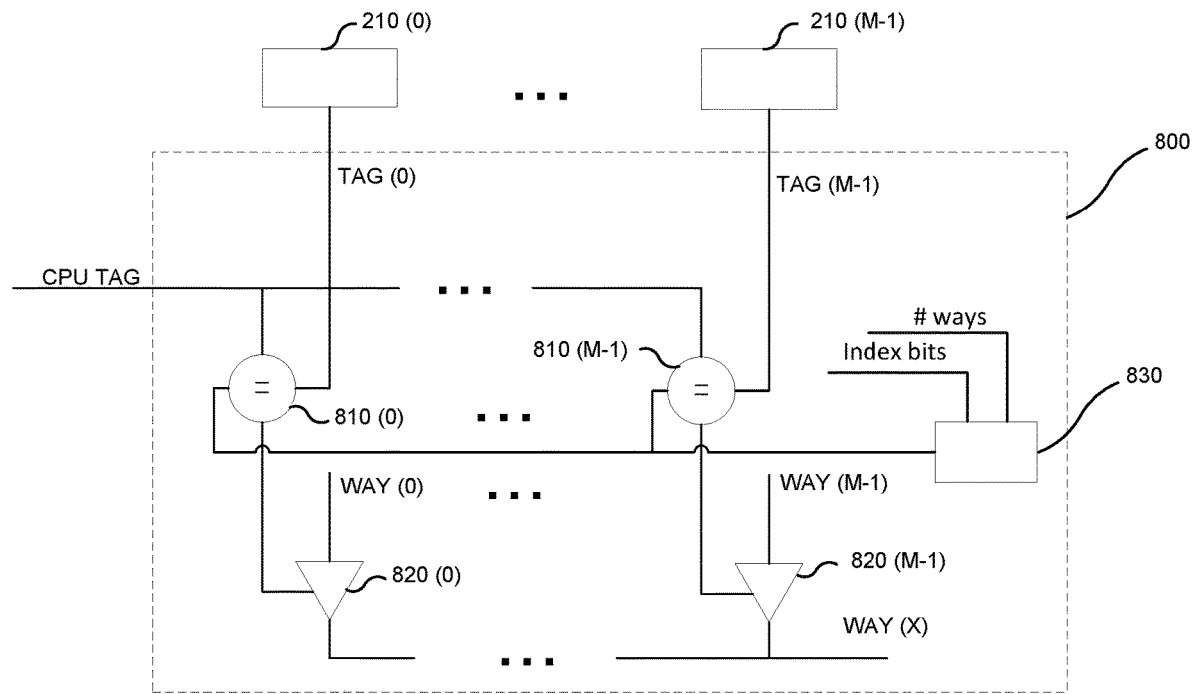
FIG. 8 is a schematic illustration of a comparison circuit, which is configured to identify which of the M ways has the instruction requested by a CPU.

FIG. 8 is a schematic illustration of a peripheral comparison circuit 800, which is configured to identify which, if any, of the M ways has the instruction requested by the CPU 110. Comparison circuit 800 includes tag comparators 810(0) to 810(M−1), tri-state driver arrays 820(0) to 820(M−1), and comparator enable circuit 830. In some embodiments, alternative comparison circuits are used.

As illustrated, comparison circuit 800 receives the tag portion of the CPU address at bus CPUTAG. In addition, comparison circuit 800 receives M tags at tag busses TAG(0) to TAG(M−1). Each of the M tags is generated as the result of reading one of the tag memory portions 210(0) to 210 (M−1) of the M ways. Furthermore, comparison circuit 800 receives log 2(M) index bits (index bits j+1:j+log 2(M)), and an indication of the programmed number of ways at bus # ways.

Each of tag comparators 810(0) to 810(M−1) is configured to compare one of the M tags with the tag portion of the CPU address at bus CPUTAG if enabled by comparator enable circuit 830. At most one of the M tags provided to an enabled tag comparator matches the tag portion of the CPU address.

If the cache memory 200 is programmed for M ways, comparator enable circuit 830 enables all M of the tag comparators 810(0) to 810(M−1).

If the cache memory 200 is programmed for M/n ways, where n∈{2, 4, . . . $a^2$}, and where a is an integer and $a^2$ is less than M, comparator enable circuit 830 enables M/n of the tag comparators 810(0) to 810(M−1). Which M/n of the M tags are compared with the tag portion of the CPU address is determined based on log 2(n) index bits (j+1:j+log 2(n)).

For example, if M=8 and n=2, which of the M/n=4 of the M=8 tags are compared with the tag portion of the CPU address is determined based on 1 index bit (j+1). For example, if index bit (j+1)=0, the comparator enable circuit 830 may enable tag comparators 810(0), 810(2), 810(4), and 810(6), and if index bit (j+1)=1, the comparator enable circuit 830 may enable tag comparators 810(1), 810(3), 810(5), and 810(7).

As another example, if M=8 and n=4, which of the M/n=2 of the M=8 tags are compared with the tag portion of the CPU address is determined based on 2 index bits (j+1, and j+2). For example, if index bit (j+1)=0 and index bit (j+2)=0, the comparator enable circuit 830 may enable tag comparators 810(0) and 810(4), if index bit (j+1)=0 and index bit (j+2)=1, the comparator enable circuit 830 may enable tag comparators 810(2) and 810(6), if index bit (j+1)=1 and index bit (j+2)=0, the comparator enable circuit 830 may enable tag comparators 810(1) and 810(5), and if index bit (j+1)=1 and index bit (j+2)=1, the comparator enable circuit 830 may enable tag comparators 810(3) and 810(7).

If the cache memory 200 is programmed for one 1 way, comparator enable circuit 830 may enable one of the tag comparators 810(0) to 810(M−1). Which one of the M tags are compared with the tag portion of the CPU address is determined based on log 2(M) index bits (j+1:j+log 2(M)). For example, if M=8, which one of the 8 tags is compared with the tag portion of the CPU address is determined based on 3 index bits (j+1, j+2, and j+3), where the three bits encode which of the 8 tags is compared with the tag portion of the CPU address using any encoding scheme known to those of skill in the art.

Tri-state driver arrays 820(0) to 820(M−1) each have data inputs which receive data identifying one of the M ways. The data inputs of each of the tri-state driver arrays 820(0) to 820(M−1) are connected to one of the way identification busses WAY(0) to WAY(M−1). In addition, tri-state driver arrays 820(0) to 820(M−1) each receive an indication of whether a particular one of the M tags at tag busses TAG(0) to TAG(M−1) matches the tag portion of the CPU address at bus CPUTAG.

The tri-state driver arrays receiving indications that the particular one of the M tags associated therewith does not match the tag portion of the CPU address at bus CPUTAG have outputs which are tri-stated, and are high impedance.

If the cache memory 200 is programmed for M ways, the tri-state driver receiving the indication that the particular one of the M tags associated therewith does match the tag portion of the CPU address at bus CPUTAG, outputs data at way bus WAY(X) indicating the particular way identified at its data input.

If the cache memory 200 is programmed for M/n ways, the tri-state driver receiving the indication that the particular one of the M/n tags associated therewith does match the tag portion of the CPU address at bus CPUTAG, outputs data at way bus WAY(X) indicating the particular way identified at its data input, where the log 2(n) msbs of the data output at way bus WAY(X) are equal to the log 2(n) index bits (j+1:j+log 2(n)) used by comparator enable circuit 830 to select which tag comparators 810(0) to 810(M−1) to enable.

If the cache memory 200 is programmed for one way, the tri-state driver receiving the indication that the compared tag does match the tag portion of the CPU address at bus CPUTAG, outputs data at way bus WAY(X) indicating the particular way identified at its data input, where the log 2(M) msbs of the data output at way bus WAY(X) are equal to the log 2(M) index bits (j+1:j+log 2(M)) used by comparator enable circuit 830 to select which tag comparators 810(0) to 810(M−1) to enable.

Accordingly, the tri-state driver arrays 820(0) to 820(M−1) perform a multiplexing function which passes data identifying the particular way having tag data matching the tag portion of the CPU address. As understood by those of skill in the art, alternative circuits performing the multiplexing function may alternatively be used.

In some embodiments, comparison circuit 800 additionally generates a hit condition indication signal. For example, a logic circuit performing a logical OR on the outputs of tag comparators 810(0) to 810(M−1) may generate the hit condition indication signal. Alternatively, the way bus WAY(X) remaining in a tri-state condition, because none of the tri-state driver arrays 820(0) to 820(M−1) drive the way bus WAY(X), may serve as the hit condition indication signal.

Figure 9:
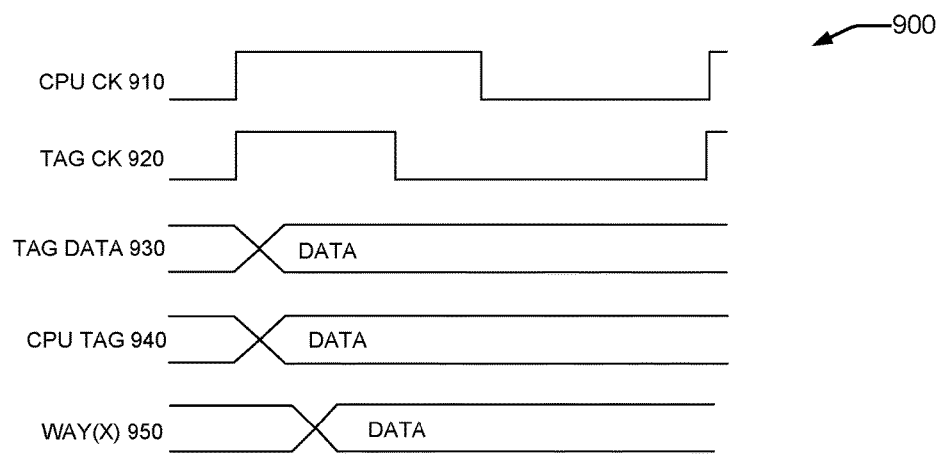
FIG. 9 illustrates a timing diagram schematically illustrating certain timing relationships for various operations of a cache memory and a comparison circuit.

FIG. 9 illustrates a timing diagram 900 schematically illustrating certain timing relationships for various operations of cache memory 200 and comparison circuit 800. Timing diagram 900 illustrates CPU clock waveform 910, tag clock waveform 920, tag data waveform 930, CPU tag data waveform 940, and way bus data waveform 950.

CPU clock waveform 910 illustrates a representation of a CPU clock used by the CPU 110, and has characteristics similar or identical to CPU clock waveform 710 of FIG. 7.

Tag clock waveform 920 illustrates a representation of a tag clock used by tag memory portion 210, and has characteristics similar or identical to tag clock waveform 720 of FIG. 37.

Tag data waveform 930 illustrates a representation of tag data identifying the M tags at tag busses TAG(0) to TAG(M−1).

CPU tag data waveform 940 illustrates a representation of the tag portion of the CPU address at bus CPUTAG.

Way bus data waveform 950 illustrates a representation of way identification data at way bus WAY(X).

During a first portion of a CPU clock period, the tag clock is active (high). In response to the tag clock being active, the M tag memory portions 210(0) to 210(M−1) identified by the index portion of the CPU address are read to retrieve M tags. The M tags are respectively represented by data at tag busses TAG(0) to TAG(M−1). In addition, while the tag clock is active, the M tags are compared with the tag portion of the CPU address by comparators 810(0) to 810(M−1), for example, as discussed above with reference to comparison circuit 800.

Furthermore, while the tag clock is active, tri-state driver arrays 820(0) to 820(M−1) each receive data identifying one of the M ways from the way identification busses WAY(0) to WAY(M−1). In addition, tri-state driver arrays 820(0) to 820(M−1) each receive an indication from a corresponding comparator 810 indicating whether a particular one of the M tags at tag busses TAG(0) to TAG(M−1) matches the tag portion of the CPU address at bus CPUTAG.

In addition, while the tag clock is active, if there was a hit condition, the tri-state driver array receiving the indication that the particular one of the M tags associated therewith matches the tag portion of the CPU address at bus CPUTAG, outputs way identification data at way bus WAY(X) identifying the particular way identified at its data input. If there was not a hit condition, the way bus WAY(X) remains in a tri-state condition.

In addition, while the tag clock is active, a hit condition indication signal is generated.

Timing diagram 900 schematically illustrates an embodiment of certain timing relationships for CPU clock waveform 910, tag clock waveform 920, tag data waveform 930, CPU tag data waveform 940, and way bus data waveform 950. Alternative timing relationships may alternatively be used. For example, the phase relationship between CPU clock waveform 910 and tag clock waveform 920 may be modified. Additionally or alternatively, in some embodiments, the active state of tag clock waveform 920 is low.

Figure 10:
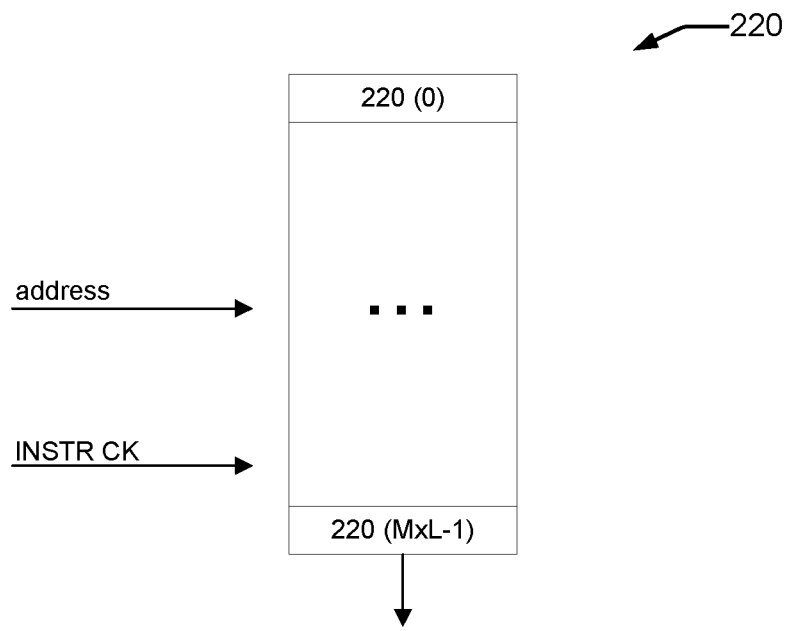
FIG. 10 is a schematic illustration of an instruction memory portion of a cache memory according to some embodiments.

FIG. 10 is a schematic illustration of an instruction memory portion 220 of a cache memory 200 according to some embodiments. Instruction memory portion 220 includes memory locations for instructions stored in all of the ways of cache memory 200. Accordingly, instruction memory portion 220 includes stores instructions in memory locations 220(0) to 220(M*L−1), where M is equal to the maximum number of ways, and L is equal to the length (number of instruction memory locations) in each way.

As illustrated, instruction memory portion 220 receives an address. Instruction memory portion 220 is configured to be read so as to output the instruction stored in the memory location associated with the received address.

If the cache memory 200 is programmed for M ways, the received address includes a tag portion having log 2(M) bits and an index portion having log 2(M*L−1)−log 2(M) bits. The tag portion is generated by comparison circuit 800 and is formed by the way data at way bus WAY(X) indicating the particular way identified as having tag data matching the tag portion of the CPU address.

If the cache memory 200 is programmed for M/n ways, the received address may include a tag portion having log 2(M) bits and an index portion having log 2(M*L−1)−log 2(M) bits. The tag portion is generated by comparison circuit 800 and is formed by the way data at way bus WAY(X) indicating the particular way identified as having tag data matching the tag portion of the CPU address. Alternatively, because the log 2(n) msbs of the tag portion are equal to the log 2(n) index bits (j+1:j+log 2(n)), the received address may be formed from a tag portion having log 2(M/n) bits and an index portion having log 2(M*L−1)−log 2(M/n) bits.

If the cache memory 200 is programmed for one way, the received address may include a tag portion having log 2(M) bits and an index portion having log 2(M*L−1)−log 2(M) bits. The tag portion is generated by comparison circuit 800 and is formed by the way data at way bus WAY(X) indicating the particular way identified as having tag data matching the tag portion of the CPU address. Alternatively, because the bits of the tag portion are equal to the index bits (j+1:j+log 2(M)), the received address may be formed from only an index portion having log 2(M*L−1) bits.

The index portion of the received address is formed by the index portion of the CPU address, where log 2(M) of the bits are optionally part of the tag portion of the CPU address and are optionally part of the index portion of the CPU address, based on the number of ways the cache memory 200 is programmed to have.

Figure 11:
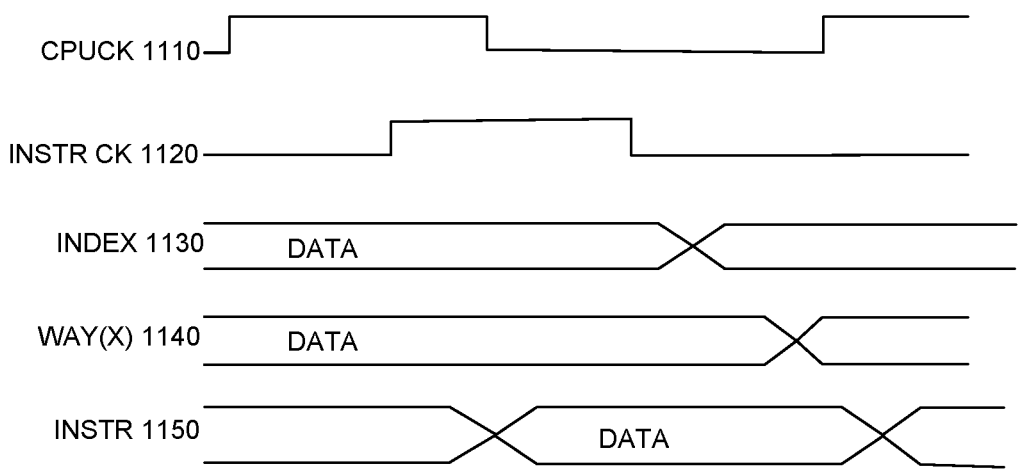
FIG. 11 illustrates a timing diagram schematically illustrating certain timing relationships for various operations instruction of a memory portion of a cache memory.

FIG. 11 illustrates a timing diagram 1100 schematically illustrating certain timing relationships for various operations instruction memory portion 220 of cache memory 200. Timing diagram 1100 illustrates CPU clock waveform 1110, instruction clock waveform 1120, index data waveform 1130, way data waveform 1140, and instruction data waveform 1150.

CPU clock waveform 1110 illustrates a representation of a CPU clock used by the CPU 110, and has characteristics similar or identical to CPU clock waveform 710 of FIG. 7.

Instruction clock waveform 1120 illustrates a representation of an instruction clock used by instruction memory portion 220, and has characteristics similar or identical to instruction clock waveform 720 of FIG. 7.

Index data waveform 1130 illustrates a representation of the index portion of the CPU address at bus CPUTAG.

Way data waveform 1140 illustrates a representation of way identification data at way bus WAY(X).

Instruction data waveform 1150 illustrates a representation of the instruction read from instruction memory portion 220.

During a second portion of the CPU clock period, subsequent to the first portion of the CPU clock period discussed with reference to FIG. 9, the instruction clock is active (high). In response to the instruction clock being active, the way identification data and the index portion of the CPU address are used to read an instruction from the instruction memory portion 220. Once read, the instruction read from the instruction memory portion 220 is returned to the CPU 110 as the instruction requested by the CPU 110.

Timing diagram 1100 schematically illustrates an embodiment of certain timing relationships for CPU clock waveform 1110, instruction clock waveform 1120, index data waveform 1130, way data waveform 1140, and instruction data waveform 1150. Alternative timing relationships may alternatively be used. For example, the phase relationship between CPU clock waveform 1110 and instruction clock waveform 1120 may be modified. Additionally or alternatively, in some embodiments, the active state of instruction clock waveform 1120 is low.

Figure 12:
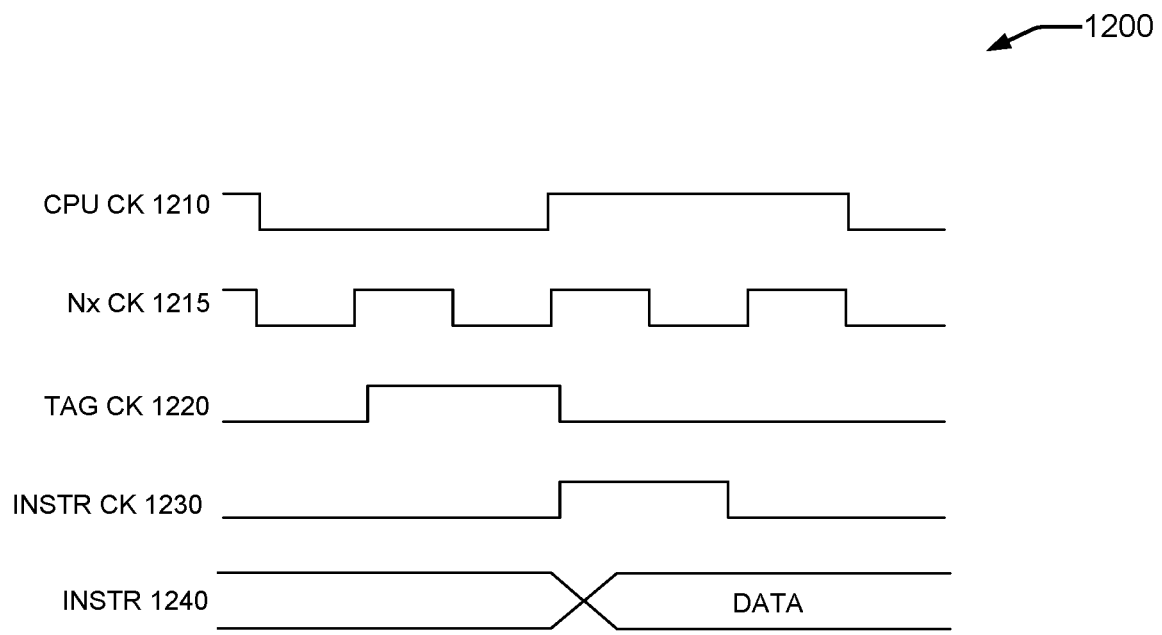
FIG. 12 illustrates a timing diagram schematically illustrating another embodiment of certain timing relationships for various operations of a cache memory.

FIG. 12 illustrates a timing diagram 1200 schematically illustrating another embodiment of certain timing relationships for various operations of cache memory 200. Timing diagram 1200 illustrates CPU clock waveform 1210, NxCPU clock waveform 1210, tag clock waveform 1220, instruction clock waveform 1230, and instruction waveform 1240. The illustrated waveforms correspond with clocks generated by clock generation circuits understood by those of skill in the art.

CPU clock waveform 1210 illustrates a representation of a CPU clock used by the CPU 110. As understood by those of skill in the art, the CPU clock represented by CPU clock waveform 1210 may be used by CPU 110, for example, to receive input data, to execute instructions, and to generate output data. CPU 110 may use the CPU clock represented by CPU clock waveform 1210 to additionally perform other operations. CPU 110 may use additional clocks (not shown).

NxCPU clock waveform 1215 illustrates a representation of a clock which has a frequency which is a multiple of the frequency of the CPU clock. In this embodiment, the frequency of the clock of NxCPU clock waveform 1215 has a frequency which is three times the frequency of the CPU clock. The clock of NxCPU clock waveform 1215 may be generated based on the CPU clock using circuits known to those of skill in the art.

Tag clock waveform 1220 illustrates a representation of a tag clock used by tag memory portion 210. The tag clock represented by tag clock waveform 1220 may be used by tag memory portion 210, for example, for writing and reading tag data to and from tag memory portion 210.

Instruction clock waveform 1230 illustrates a representation of an instruction clock used by instruction memory portion 220. The instruction clock represented by instruction clock waveform 1230 may be used by instruction memory portion 220, for example, for writing and reading instruction data to and from instruction memory portion 220.

Instruction waveform 1240 illustrates a representation of instruction data. The instruction data encodes instructions which are executable by CPU 110, and which are provided to CPU 110 by cache memory 200, for example, for execution by CPU 110.

As illustrated in FIG. 12, during a first portion of a CPU clock period, the tag clock is active (high). While the tag clock is active, the M tag memory portions 210(0) to 210(M-1) identified by the index portion of the CPU address are read to retrieve M tags. In addition, while the tag clock is active, the M tags are each compared with the tag portion of the CPU address. If one of the M tags matches the tag portion of the CPU address, the way having the matching tag is identified.

During a second, subsequent, portion of the CPU clock period, the instruction clock is active (high). During the second portion of the CPU clock period, the index portion of the CPU address is used to perform a read operation on the instruction memory portion 220(x) of the identified way to read an instruction therefrom. Once read, the instruction read from the instruction memory portion 220(x) of the identified way is returned to the CPU 110 as the instruction requested by the CPU 110.

Timing diagram 1200 schematically illustrates an embodiment of certain timing relationships for CPU clock waveform 1210, NxCPU clock waveform 1215, tag clock waveform 1220, instruction clock waveform 1230, and instruction waveform 1240. Alternative timing relationships may alternatively be used. For example, the phase relationship between CPU clock waveform 1210 and an of NxCPU clock waveform 1215, tag clock waveform 1220, and instruction clock waveform 1230 may be modified. Additionally or alternatively, in some embodiments, the active states of either or both of tag clock waveform 1220 and instruction clock waveform 1230 are low.

Though the present invention is disclosed by way of specific embodiments as described above, those embodiments are not intended to limit the present invention. Based on the methods and the technical aspects disclosed herein, variations and changes may be made to the presented embodiments by those of skill in the art without departing from the spirit and the scope of the present invention.

What is claimed is:

1. A cache memory, comprising:
   a memory block programmable to operate in a direct access mode or an M-ways mode responsive to a way quantity indication, the memory block comprising:
   an instruction memory portion, wherein the instruction memory portion comprises a plurality of instruction memory locations each configured to store instruction data encoding a CPU instruction, the instruction memory portion arranged in a single column, such that each row corresponds to a single CPU instruction; and
   a tag memory portion, wherein the tag memory portion comprises a plurality of tag memory locations each configured to store tag data encoding an address range of a RAM memory where one of the CPU instructions are stored; and
   one or more peripheral circuits coupled with the memory block and configured to:
   receive a CPU address corresponding with an address of the RAM memory storing a particular CPU instruction, wherein the CPU address has a plurality of bits divided into a tag portion and an index portion, the tag portion comprising tag data for the for the particular CPU instruction, and the index portion comprising memory address data for the cache memory;

receive the way quantity indication indicating an integer number (M) of ways into which the instruction memory portion and the tag memory portion are to be subdivided, M being 1 for the direct access mode, and M being greater than 1 for the M-ways mode;

responsive to M being 1, such that the way quantity indication indicates that the instruction memory portion and the tag memory portion are to be subdivided into a single way, read the instruction memory location of the instruction memory portion during a second time period during which an instruction clock is active, wherein the instruction memory location is identified by the index portion of the CPU address without data from the tag portion of the CPU address when M equals 1; and responsive to M being greater than one, such that the way quantity indication indicates that the instruction memory portion and the tag memory portion are to be subdivided into a plurality of ways:

identify which bits of the CPU address form the tag portion based on the way quantity indication;

generate a hit condition indication signal, during a first time period during which a tag clock is active prior to the second time period, based on determining whether the particular CPU instruction is stored in the cache memory based on the identified tag portion and tag data stored in the cache memory;

read tag memory locations of the tag memory portion during the first time period, the read tag memory locations each identified with the index portion of the CPU address; and read an instruction memory location of the instruction memory portion during the second time period, wherein the instruction memory location is identified by a combination of the tag address data read during the first time period and the index portion of the CPU address when M is greater than one.

2. The cache memory of claim 1, wherein the one or more peripheral circuits are configured to identify which bits of the CPU address form the index portion based on the way quantity indication.

3. The cache memory of claim 2, wherein, responsive to M being greater than one and determining that the particular CPU instruction is stored in the cache memory based on the identified tag portion and tag data stored in the cache memory, the one or more peripheral circuits are configured to read the cache memory to retrieve the particular CPU instruction using the index portion as cache memory address data.

4. The cache memory of claim 2, wherein, in response to the way quantity indication indicating that the instruction memory portion and the tag memory portion are to be subdivided into a plurality of ways, the one or more peripheral circuits are configured to read the cache memory to retrieve the particular CPU instruction using the index portion and a portion of the tag portion as cache memory address data.

5. The cache memory of claim 2, wherein, in response to the way quantity indication indicating that the instruction memory portion and the tag memory portion are to be subdivided into a single way, the one or more peripheral circuits are configured to read the cache memory to retrieve the particular CPU instruction using the index portion as cache memory address data without using the tag portion as cache memory address data.

6. The cache memory of claim 1, wherein the one or more peripheral circuits comprise a peripheral comparison circuit configured to determine whether the particular CPU instruction is stored in the cache memory.

7. The cache memory of claim 1, wherein the one or more peripheral circuits comprise a peripheral comparison circuit configured to, in response to the way quantity indication indicating that the instruction memory portion and the tag memory portion are to be subdivided into a plurality of ways, identify which of the plurality of ways of the instruction memory portion the particular CPU instruction is stored in.

8. A method of using a cache memory implemented as a memory block programmable to operate in a direct access mode or an M-ways mode responsive to a way quantity indication, the method comprising:

with an instruction memory portion of the cache memory, the instruction memory portion comprising a plurality of instruction memory locations, storing instruction data encoding a plurality of CPU instructions, the instruction memory portion arranged in a single column, such that each row corresponds to a single CPU instruction;

with a tag memory portion of the cache memory, the tag memory portion comprising a plurality of tag memory locations, storing tag data encoding address ranges of a RAM memory where the CPU instructions are stored;

with one or more peripheral circuits of the cache memory, receiving a CPU address corresponding with an address of the RAM memory storing a particular CPU instruction, wherein the CPU address has a plurality of bits divided into a tag portion and an index portion, the tag portion comprising tag data for the for the particular CPU instruction, and the index portion comprising memory address data for the cache memory;

with the one or more peripheral circuits, receiving the way quantity indication indicating an integer number (M) of ways into which the instruction memory portion and the tag memory portion are to be subdivided, M being 1 for the direct access mode, and M being greater than 1 for the M-ways mode;

with the one or more peripheral circuits, responsive to M being 1, such that the way quantity indication indicates that the instruction memory portion and the tag memory portion are to be subdivided into a single way, reading the instruction memory location of the instruction memory portion during a second time period during which an instruction clock is active, wherein the instruction memory location is identified by the index portion of the CPU address without data from the tag portion of the CPU address when M equals 1; and with the one or more peripheral circuits, responsive to M being greater than one, such that the way quantity indication indicates that the instruction memory portion and the tag memory portion are to be subdivided into a plurality of ways:

identifying which bits of the CPU address form the tag portion based on the way quantity indication;

generating a hit condition indication signal, during a first time period during which a tag clock is active prior to the second time period, based on determining whether the particular CPU instruction is stored in the cache memory based on the identified tag portion and tag data stored in the cache memory;

reading tag memory locations of the tag memory portion during the first time period, the read tag memory locations each identified with the index portion of the CPU address; and reading an instruction memory location of the instruction memory portion during the second time period, wherein the instruction memory location is identified by a combination of the tag address data read during the first time period and the index portion of the CPU address when M is greater than one.

9. The method of claim 8, further comprising, with the one or more peripheral circuits, identifying which bits of the CPU address form the index portion based on the way quantity indication.

10. The method of claim 9, further comprising, with the one or more peripheral circuits, responsive to M being greater than one and determining that the particular CPU instruction is stored in the cache memory based on the identified tag portion and tag data stored in the cache memory, reading the cache memory to retrieve the particular CPU instruction using the index portion as cache memory address data.

11. The method of claim 9, further comprising, in response to the way quantity indication indicating that the instruction memory portion and the tag memory portion are to be subdivided into a plurality of ways, with the one or more peripheral circuits, reading the cache memory to retrieve the particular CPU instruction using the index portion and a portion of the tag portion as cache memory address data.

12. The method of claim 9, further comprising, in response to the way quantity indication indicating that the instruction memory portion and the tag memory portion are to be subdivided into a single way, with the one or more peripheral circuits, reading the cache memory to retrieve the particular CPU instruction using the index portion as cache memory address data without using the tag portion as cache memory address data.

13. The method of claim 8, wherein the one or more peripheral circuits comprise a peripheral comparison circuit, and the method further comprises, with the peripheral comparison circuit, determining whether the particular CPU instruction is stored in the cache memory.

14. The method of claim 8, wherein the one or more peripheral circuits comprise a peripheral comparison circuit, and the method further comprises, with the peripheral comparison circuit, in response to the way quantity indication indicating that the instruction memory portion and the tag memory portion are to be subdivided into a plurality of ways, identifying which of the plurality of ways of the instruction memory portion the particular CPU instruction is stored in.

* * * * *